(No Model.) 3 Sheets—Sheet 1.

B. W. HOYT, Dec'd.
E. S. HOYT, Administratrix.
PRESSURE WELDING MACHINE.

No. 536,726. Patented Apr. 2, 1895.

Witnesses:
George H. Sonneborn,
Frederick H. Davis

Inventor:
Eleanor S. Hoyt
as Administratrix of
Benjamin W. Hoyt
by Harold B. _____ Atty (No Model.) 3 Sheets—Sheet 2.

B. W. HOYT, Dec'd.
E. S. Hoyt, Administratrix.
PRESSURE WELDING MACHINE.

No. 536,726. Patented Apr. 2, 1895.

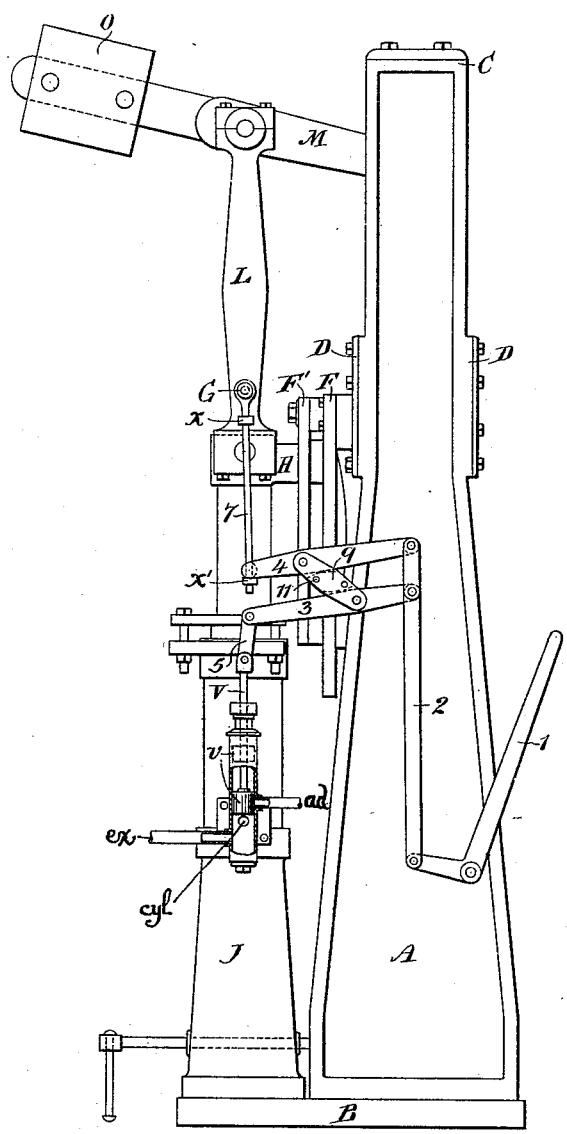

ns. State

UNITED STATES PATENT OFFICE.

ELEANOR S. HOYT, OF BROOKLYN, NEW YORK, ADMINISTRATRIX OF BENJAMIN W. HOYT, DECEASED.

PRESSURE WELDING-MACHINE.

SPECIFICATION forming part of Letters Patent No. 536,726, dated April 2, 1895.

Application filed November 16, 1893. Serial No. 491,183. (No model.)

*To all whom it may concern:*

Be it known that BENJAMIN WILLIAM HOYT, late of Brooklyn, New York, deceased, did invent a new and useful Improvement in Machines for Pressure Welding or Swaging, and that I, ELEANOR S. HOYT, of Brooklyn aforesaid, administratrix of the estate of the said BENJAMIN WILLIAM HOYT, hereby declare that the following is a full and correct description thereof, referring to the accompanying drawings, which form part of this specification.

The invention relates particularly to machines designed to weld or swage pipes, pipe ends, pipe couplings, welded and unwelded tubes, cylinders, and similar devices, the object being to insure facility, sureness, and accuracy of adjustment, for the various shapes of the devices welded or swaged, combined with simplicty of operation and uniformity of result, and the most effective application of the power or pressure.

To these and certain incidental ends and purposes, which will hereinafter more fully appear said invention in its preferred embodiment consists of the apparatus and its several parts constructed, arranged, combined and used substantially as herein described and illustrated while the novel features and combination of features are more generically set forth in the claims.

Figure 1:
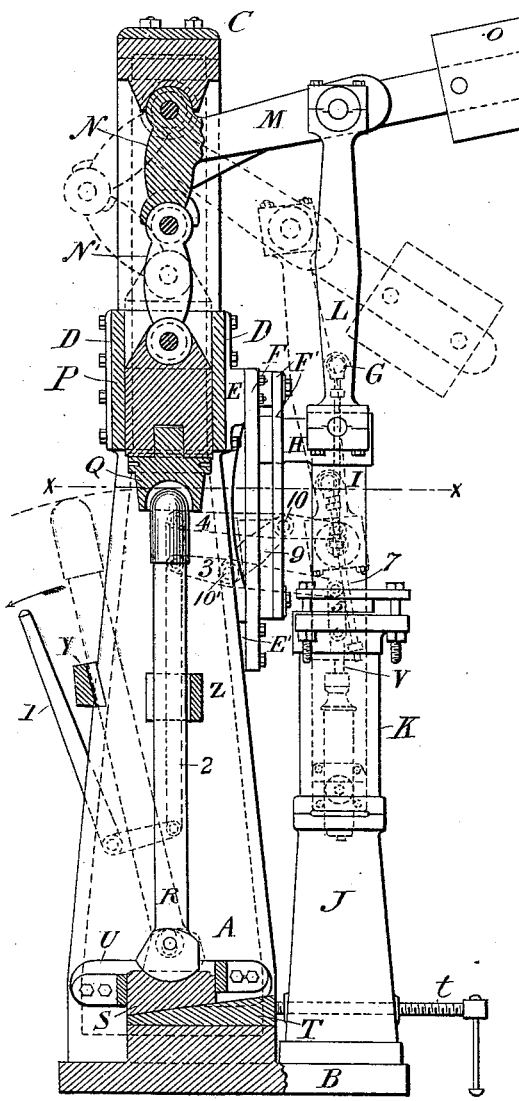
Figure 2:
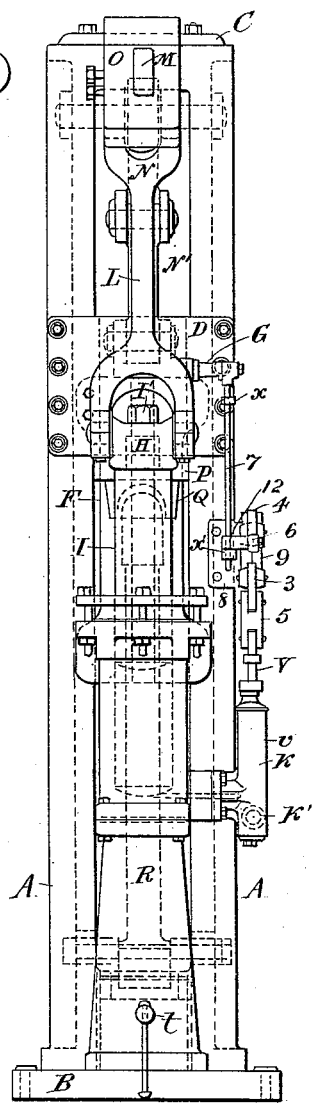
Figure 3:
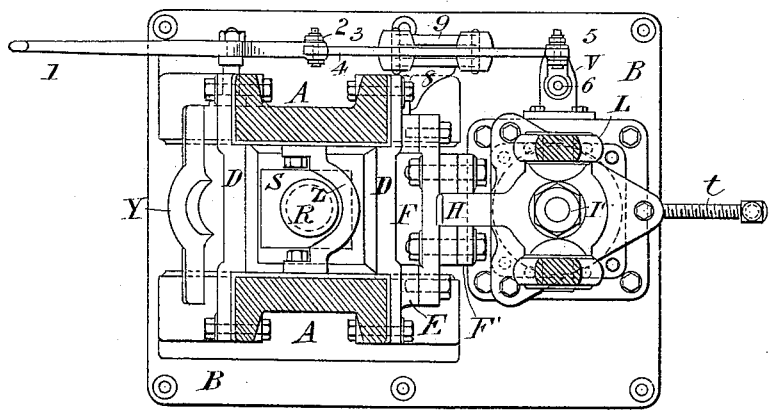
Figure 4:
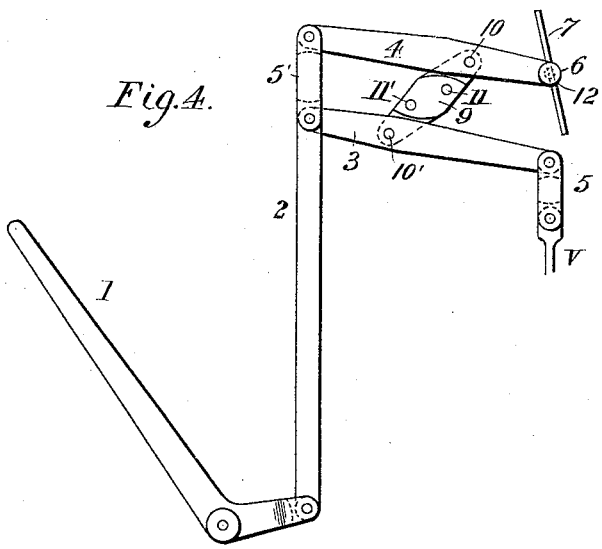

In the drawings, Figure 1 is a side elevation of a welding machine, partly in section; Fig. 2, a rear elevation of same; Fig. 3, a sectional plan view on plane *x—x* of Fig. 1; Fig. 4, a detail view of valve operating levers and connections, and Fig. 5 a side elevation looking toward the left in Fig. 2.

Throughout the figures like letters and numerals of reference indicate like parts.

In the drawings A represents the supporting frame having parallel side plates rising from the base B and connected at their upper ends by a cap-plate, C; and D indicates parallel guide-plates which connect the opposite side-plates of the frame at an intermediate point. A bracket E, which is bolted to one of the guide plates D, and blocks, E', which are bolted to the edges of the side-plates of the frame, form, together, the supports for the parallel vertical guides, F, F', between which reciprocates the cross-head, H.

P, is the head-block mounted slidingly between the guide-plates D, and carrying the detachable former block or die Q, of form or shape as desired to conform to the character or shape of the weld or part to be made.

R is a mandrel, which is hinged or loosely pinned at its lower extremity to the foot-block S, fitted in a vertical guide-way U and resting upon an adjustable block T having an adjusting screw, *t*, designed to force the wedge-block in and out under the foot-block to raise or lower the same according to the demands of operation. Front and rear stops, *y* and *z*, are provided in the path of the swing of the mandrel to limit its movement and respectively hold the same in position for the application of a pipe, tube or cylinder, and to maintain the same in alignment with the direction of movement of the head-block in order to present such articles in position to receive the pressure imparted to the former block. The head-block is connected to the cap-piece by means of a toggle-lever comprising the members N N', to the upper of which is fixed a gravity lever M provided with a weight O which may or may not be adjustable as preferred, and which is connected at an intermediate point to the cross-head H by a link L.

J is the pedestal that supports the ram cylinder. The ram or piston is shown at I connected to the cross-head. The valve casing K and valve stem V are clearly shown in Figs. 2, 3, and 5; and in the last named figure one form of valve *v* is shown. The admission and exhaust are indicated by "Ad." and "Ex." and the connection to the ram cylinder by "Cyl." As seen in the figure the exhaust has just been opened by the rise of the ram raising the valve stem V. The partial descent of the valve closes the exhaust from the ram and opens the admission. The proportion of the parts as shown are not intended to be exact for the details of this valve are mere matters of selection so far as the present invention is concerned, and are only shown to indicate any valve so operating.

At 1 is shown the hand lever, fulcrumed upon the frame A connected by a vertical connecting rod, 2, to the twin parallel shifting levers, 3, and 4. The shifting lever 3 is connected by a link 5 to the valve stem V, while to the shifting lever 4 is swiveled the vertical tappet-rod 7. This swivel connection is shown at 6 in Figs. 2 and 4. This tappet-rod 7 slides vertically through an aperture in the guide, 12, carried by the swivel. It is pivotally connected at its upper extremity by a post G to the link L, and is provided with adjustable stops or collars, $x$, $x'$. The shifting levers 3, 4, are pivoted severally at 10, 10', to an inclined bracket 9 which is bolted at 11, 11', to the guide-bars F, F'. The shorter arm of the lever 3 and the longer arm of the lever 4 are connected with the rod 2, a pivotal portion 5' of said rod forming the connection between the said shifting levers. By this arrangement the free end of the lever 3 travels through a longer arc than the corresponding or shorter end of the lever 4.

The operation of the machine is substantially as follows: The swinging mandrel is inclined forward, out of alignment with the movement of the former-block, to the position shown in dotted lines in Fig. 1, where it may receive the article to be welded and then be returned to the position shown in full lines in said figure. This places the article directly beneath the former block, such movement of the mandrel being possible when the head-block and connected parts, including the toggle-lever, weighted arm, cross-head, &c., are in the positions shown in dotted lines in Fig. 1. With these parts in the said position, the ram or piston is depressed and the inlet to the cylinder is closed by the valve. The operating lever 1 is then moved in the direction indicated by the arrow in Fig. 1, thus elevating the connected ends of the shifting levers, and forcing down the valve to open communication between the supply pipe and the cylinder. The elevation of the ram or piston, which may be actuated by steam, compressed air, hydraulic or other pressure, causes the weighted arm to force the head-block down, through the medium of the toggle-lever, and thus, the former-block carried by the head-block is pressed down upon the article mounted on the upper end of the mandrel. The upward movement of the link L brings the stop $x'$, at the lower end of the tappet rod, into contact with the guide 12, thus reversing the shifting levers, 3 4, cutting off the communication between the supply and the cylinder and opening the exhaust, whereupon the weighted arm causes the elevation of the head-block. When the upper stop, $x$, of the tappet-rod engages the guide 12 the reverse operation of the parts takes place, thus throwing said parts again into operative position. If desired, the admission of the power supply to the cylinder may be controlled solely by the operating lever if a continuous automatic movement of the machine is not required.

The enumeration of details and of the many minor changes which may readily be made without departing from the principles of the invention has purposely been omitted because to set these forth at length would obscure rather than make clear the essential features, and I, the said ELEANOR S. HOYT, as administratrix, as aforesaid, claim and desire to secure, together with all such changes as may be made by mere mechanical skill and with only such limitations as are therein expressed or by law implied in view of the state of the related arts, the following:

1. In combination in a pressure welding or swaging machine the reciprocating head-block, toggles therefor, a weighted arm carried upon and turning with one link of the said toggles, and means for applying power to the said weighted arm, substantially as set forth.

2. In combination in a pressure welding or swaging machine the reciprocating head-block, toggles therefor, a weighted arm carried upon and turning with one link of the said toggles, a steam or other ram, and a connecting rod or pitman connecting the said toggle link and weighted arm with the said ram, substantially as set forth.

3. In combination in a pressure welding or swaging machine the reciprocating head-block, toggles therefor, a weighted arm carried upon and turning with one link of the said toggles, a steam or other ram actuating the said link and weighted arm, a valve for said ram, and means actuated by the motion of the parts to control the said valve, substantially as set forth.

4. In combination in a pressure welding or swaging machine, a reciprocating head, a steam or other ram and connections for applying power to the said head, a valve for the said ram, the shifting mechanism substantially as described for the said valve, and a tappet rod 7 and stops $x$, $x'$ therefor, whereby the motion of the ram and co-operating parts actuates the said shifting mechanism, substantially as set forth.

5. In a pressure welding machine, the combination, with a head-block; a ram or piston operating in a cylinder; connections between said head-block and the ram or piston; and a valve controlling the inlet to the cylinder; of a shifting mechanism comprising twin connected levers, one of which is connected to the ram or piston by a tappet rod having stops adapted to engage the said lever, and the other of which is connected to the valve.

In testimony whereof I affix my signature, as administratrix, in the presence of two witnesses.

ELEANOR S. HOYT,
*Administratrix, &c.*

Witnesses:
ROBERT STEWART,
MARCIA C. WALKER.